UNITED STATES PATENT OFFICE.

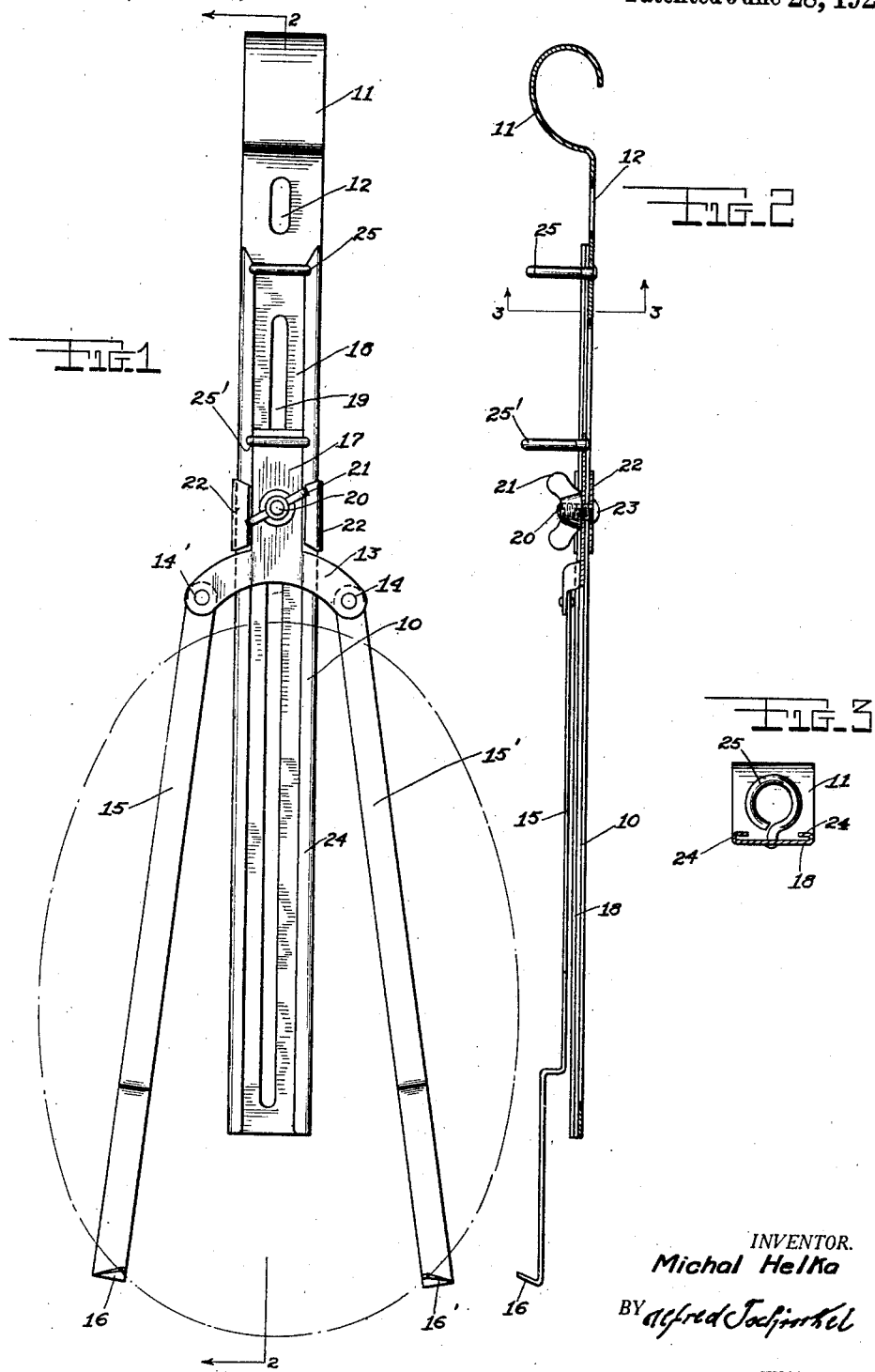

MICHAL HELKA, OF CARTHAGE, NEW YORK.

PICTURE-HANGER.

1,382,908. Specification of Letters Patent. Patented June 28, 1921.

Application filed October 22, 1919. Serial No. 332,414.

*To all whom it may concern:*

Be it known that I, MICHAL HELKA, a citizen of Poland, residing at Carthage, county of Jefferson, and State of New York, have invented certain new and useful Improvements in Picture-Hangers, of which the following is a specification.

My invention relates to improvements in picture hangers and it is the object of the invention to provide a device for hanging pictures that will prove simple in construction, comparatively cheap in manufacture and readily applicable and dirigible in use.

Another object of my invention is to provide a picture hanger which may be adjusted to hang pictures at any desired height from the floor or ceiling. Other features of my invention will be alluded to in the description and claims which follow. These objects are attained by the mechanism illustrated in the accompanying drawing, in which;—

Figure 1 is a front view of the devices constructed according to the present invention.

Fig. 2 is a section on line 2—2 of Fig. 1, and,

Fig. 3 is a sectional view taken on line 3—3 of Fig. 2.

The frame of the hanger is cheaply made of metal or any other suitable material and is formed at its upper end to a hook 11 adapted to engage the molding of a room, (not shown).

Below the hook 11, the frame is provided with an opening 12, allowing the passage of a nail or similar fastening means if it is desired to nail the device to a wall, after the picture has been adjusted to the desired height. A Y shaped slide 13 has pivotally secured as at 14 and 14' two depending members, 15 and 15', ending in supporting rests 16 and 16', for the frame of a picture to be carried by the hanger 10.

The upwardly directed shank 17 of the slide 13, slides along a stationary part 18 of the frame provided with a longitudinal slot 19, and an adjusting screw 20, is mounted to slide in said slot 19, and to be held in its adjusted position by a winged nut 21, while a sleeve 22, against the rear wall of which the head 23 of the screw 20 rests, participates in this movement.

The turned flanges 24 of the stationary part 18, guide the slide 17 during its movement, and extensions 25 and 25' are provided on the stationary and the sliding elements respectively for gripping both elements whenever the frame is being raised or lowered, and the device is hung with its hook to a molding.

In operation, the picture is placed with its base on the members 15 and 15' so that its frame with its foot part is supported by the rests 16 and 16', then the sliding part is adjusted to any desired height, and locked in this adjusted position by the winged nut 21.

It will be clear that by swinging the members 15 and 15' apart, pictures in frames of any desired widths may be accommodated. Changes may be made in the shape and form of my device without deviating from the scope and spirit of my invention.

What I claim is:—

In a picture hanger of the character described, the combination of a slotted and flanged stationary frame, an inverted Y-shaped member, the vertical portion of said Y-shaped element being slidable within the flanges of the frame member to adjust the height of said Y-shaped member in relation to the stationary member, a sleeve inclosing the vertical part of the Y-shaped member and the frame member and adapted to slide on the latter, a threaded bolt passing through the sleeve, the slot in the frame member and the sleeve, a winged nut engaging the bolt to fasten said Y-shaped member in the adjusted position, depending members pivotally attached to the outer ends of the horizontal part of said Y shaped member provided on their lower ends with rests for the support of a picture, the upper end of the stationary frame member forming a hook to engage the molding and with an opening to be engaged by a nail.

In testimony whereof I have affixed my signature.

MICHAL HELKA.